United States Patent [19]

Shinpo

[11] Patent Number: 4,936,431
[45] Date of Patent: Jun. 26, 1990

[54] SHIFT LEVER APPARATUS FOR AUTOMATIC TRANSMISSION

[75] Inventor: Yoshiharu Shinpo, Toyota, Japan

[73] Assignee: Toyota Jidosha Kabushiki Kaisha, Japan

[21] Appl. No.: 266,873

[22] Filed: Nov. 3, 1988

[30] Foreign Application Priority Data

Nov. 9, 1987 [JP] Japan .................................. 62-282360

[51] Int. Cl.⁵ .............................................. B60K 29/02
[52] U.S. Cl. .................................. 192/4 A; 74/483 K; 74/473 SW
[58] Field of Search ................. 192/4 A; 74/473 SW, 74/473 R, 483 K; 180/82 A

[56] References Cited

U.S. PATENT DOCUMENTS

| | | | |
|---|---|---|---|
| 2,875,640 | 3/1959 | Huso | 74/483 K |
| 2,890,581 | 6/1959 | Lewis | 192/4 A X |
| 3,942,614 | 3/1976 | Thompson | 192/4 A |
| 4,096,930 | 6/1978 | Viscardi | 192/4 A |
| 4,187,935 | 2/1980 | O'Hern | 192/4 A |
| 4,473,141 | 9/1984 | Mochida | 192/4 A |
| 4,768,610 | 9/1988 | Pagel et al. | 192/4 A |

Primary Examiner—Peter A. Aschenbrenner
Attorney, Agent, or Firm—Oliff & Berridge

[57] ABSTRACT

A shift lever apparatus for use with an automatic transmission of the type which is incorporated in a vehicle has a shaft member which is adapted to be rotated about its axis by the operation of a seat occupant and a shift lock mechanism arranged to engage with the shaft member to inhibit the rotation of the shaft member when the shift-lever position of "parking" or "neutral" is selected, as well as to disengage from the shaft member by the braking operation of a brake operating mechanism which is mechanically connected to the shift lock mechanism to thereby allow the shaft member to rotate about its axis. Accordingly, when the shift-lever position of "parking" or "neutral" is selected, the position of a shift lever can be changed to another shift-lever position if the shaft member is not in a braked state.

18 Claims, 10 Drawing Sheets

4,936,431

SHIFT LEVER APPARATUS FOR AUTOMATIC TRANSMISSION

BACKGROUND OF THE INVENTION

1. Field of the Invention

The present invention relates to a shift lever apparatus for an automatic transmission in a vehicle.

2. Description of the Related Art

In a vehicle which has an automatic transmission, an engine can be started only when a shift-lever position of "parking" or "neutral" is selected. Accordingly, whenever a vehicle is driven after the starting of the engine, a shifting operation is made from the shift-lever position of "parking" or "neutral" to another shift-lever position such as "drive".

During this shifting operation, brakes of the vehicle such as a hand brake or a foot brake are applied, and after completion of the shifting operation, the brakes are released and subsequently the vehicle is driven.

In order to secure steps of the above-described procedures, Japanese Patent Laid-open No. 20343/1987 proposes an apparatus in which a position of the shift lever cannot be changed from a "parking" or "neutral" position to another shift-lever position such as "driving" when the brakes are not applied.

But this conventional apparatus has disadvantages due to many sensors and a control apparatus for generating output signals on the basis of input signals from the sensors to an actuator in order to control the operation of the actuator to hold the position of the shift lever, thereby increasing the expense of the apparatus.

SUMMARY OF THE INVENTION

It is, therefore, an object of the present invention to provide a shift lever apparatus for an automatic transmission in a vehicle at a low cost wherein a position of a shift lever cannot be changed to another shift-lever position when brakes are not applied when the shift-lever is selectively in a "parking" or "neutral" position.

In the present invention, the shift lever apparatus has a shaft member which is arranged to be rotated about its axis by a shifting operation of the shift lever, and a shift lock mechanism which is arranged to engage with the shaft member to inhibit the shaft member from rotating when the shift-lever position of "parking" or "neutral" is selected, as well as to disengage from the shaft member by the braking operation of a brake apparatus which is mechanically connected to the shift lock mechanism to allow the shaft member to rotate about its axis due to disengagement.

In the present invention which has the above-described construction, the shift lock mechanism engages with the shaft member which is rotated about its axis by the shifting operation of the shift lever and inhibits the shaft member from rotating. Consequently, the shift lever is firmly held in the "parking" or "neutral" position. When a braking operation is performed in this state, the operation is mechanically transmitted so that the shift lock mechanism is caused to disengage from the shaft member. Thus, it becomes possible to rotate the shaft member about its axis and hence to change the position of the shift lever to another shift-lever position.

The above and other objects, advantages and features of the present invention will become apparent from the following description of the preferred embodiment thereof, taken in conjunction with the accompanying drawings.

DESCRIPTION OF THE PREFERRED EMBODIMENT

FIGS. 1(A) to 10(B) show a preferred embodiment of a shift lever apparatus for an automatic transmission according to the present invention.

Figure 1:
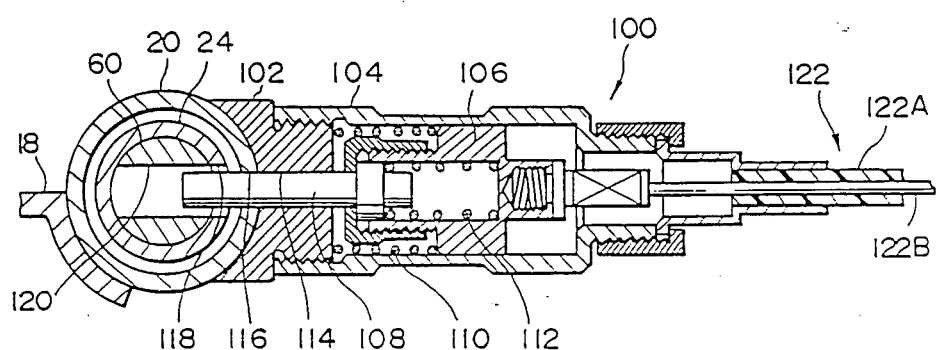
FIGS. 1(A), 1(B) and 1(C) are cross sectional views taken along line I—I of each of FIGS. 2 and 3, and show a preferred embodiment of a shift lever apparatus for an automatic transmission according to the present invention.
Figure 1:
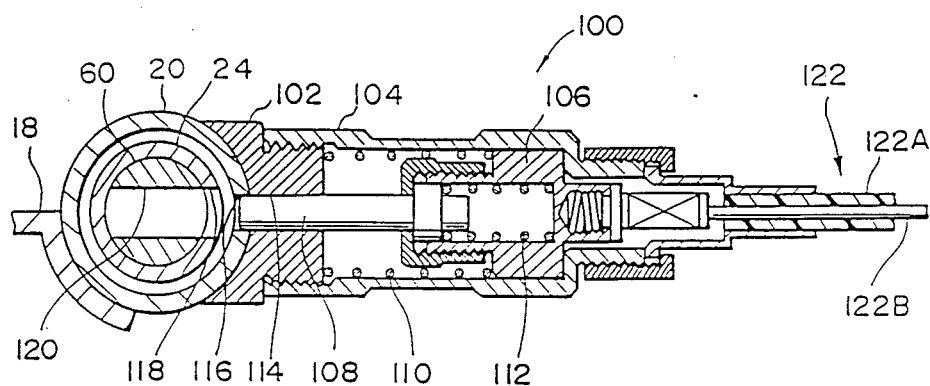
Figure 1:
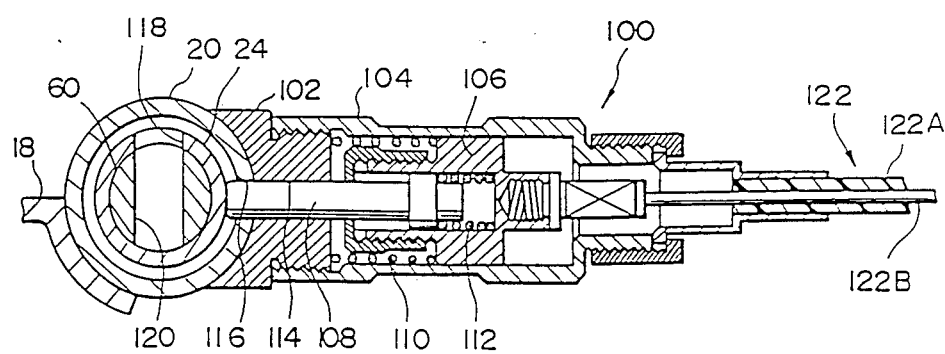
Figure 2:
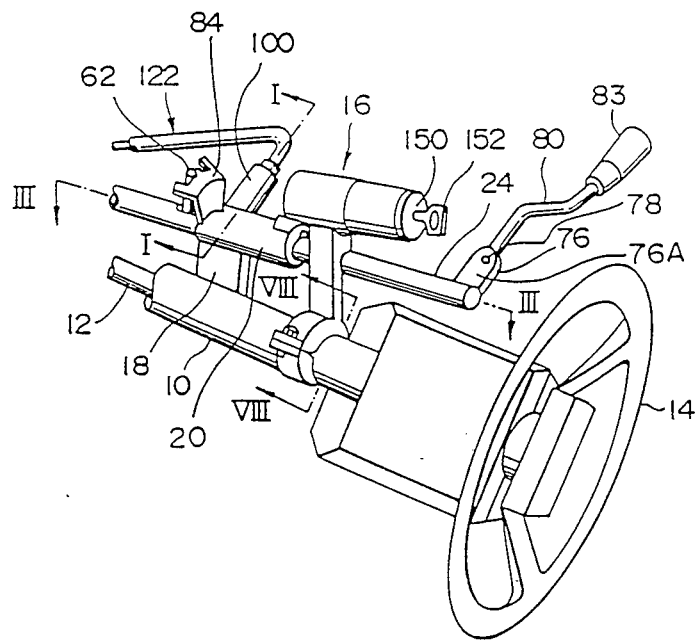
FIG. 2 is a perspective view showing the upper side of a steering column and its associated portions in which the apparatus according to the present embodiment is incorporated.

As shown in FIG. 2, the shift lever apparatus according to the presently preferred embodiment is provided on a steering column. The steering column has a column tube 10 through which a steering shaft 12 extends in the axial direction, and the upper end of the steering shaft 12 is fixed to a steering wheel 14. A steering lock 16 provided with an interlock mechanism is fixed to the column tube 10. Further, an upper support bracket 18 is fixed to the portion of the column tube 10 which is lower than the position at which the steering lock 16 is fixed.

Figure 3:
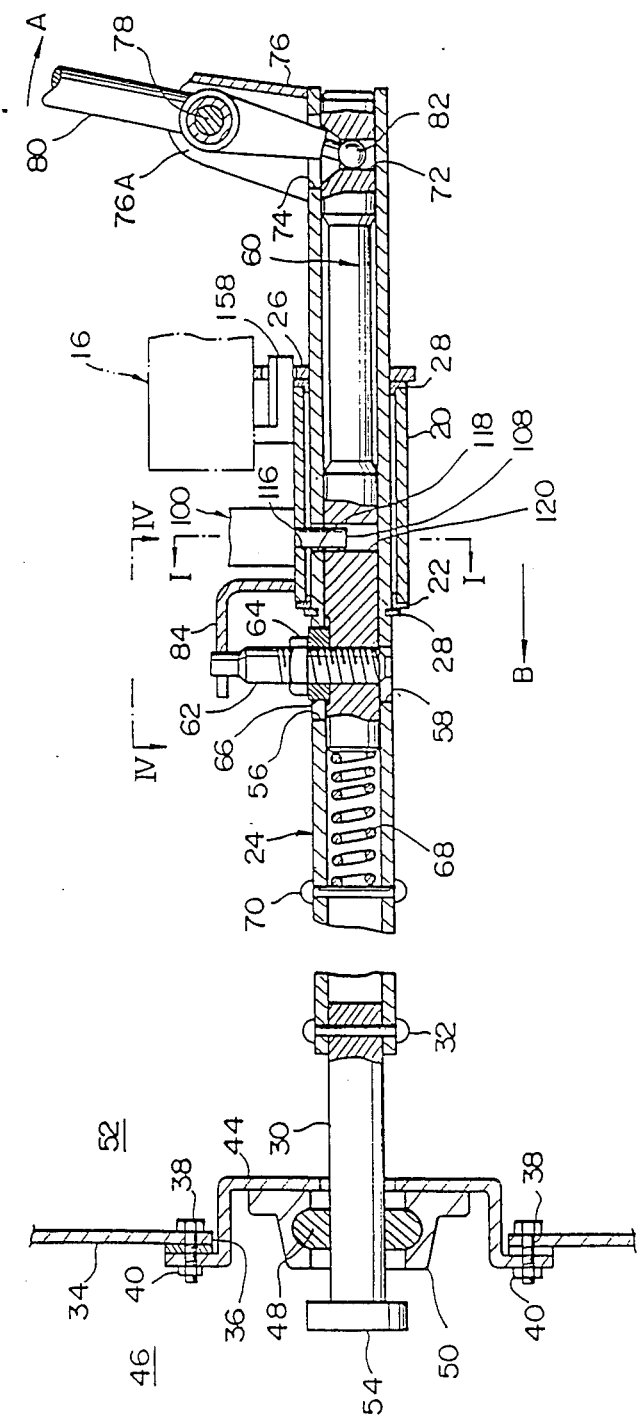
FIG. 3 is a cross-sectional view taken along line III—III of FIG. 2.

An upper support 20 of cylindrical shape is fixed to the distal end of the upper support bracket 18. As shown in FIG. 3, an upper control shaft 24 extends through the upper support bracket 18 in the axial direction in such a manner as to be supported by a bush 22 secured to the upper support bracket 20. The downward movement (the leftward movement in FIG. 3) of the upper control shaft 24 is restricted by an interlock plate 26 fixed to the outer periphery of the upper control shaft 24 at a location corresponding to the upper end (the right-hand end in FIG. 3) of the upper support 20, whereas the upward movement (the rightward movement in FIG. 3) of the upper control shaft 24 is restricted by a stop ring 28 which is fitted onto a recess formed around the outer periphery of the upper control shaft 24 at a location corresponding to the lower end (the left-hand end in FIG. 3) of the upper support 20. With this arrangement, the axial movement of the upper control shaft 24 is inhibited.

A lower control shaft 30 of cylindrical shape is fitted into the lower end portion of the upper control shaft 24.

The lower control shaft 30 and the upper control shaft 24 are coupled by a shear pin 32 which shears when subjected to a predetermined magnitude of load. The lower end portion of the lower control shaft 30 extends through a column hole cover 44 into an engine room 46, the column hole cover 44 being fixed to a dash panel 34 by bolts 38 and nuts 40 so as to cover a column hole 36 formed in the dash panel 34.

A lower support 50 provided with a spherical bush 48 is fixed to the column hole cover 44 so as to rotatably support the lower control shaft 30. A shift arm 54 is fixed to the lower end of the lower control shaft 30 which extends from an interior space 52 into the engine room 46. The shift arm 54 is linked with the manual shift valve of an automatic transmission (not shown) through the intermediary of a link mechanism (not shown) such as a shift rod and a bell crank.

Slots 56 and 58 are formed in the upper control shaft 24 at a location lower than the upper support 20 so as to provide communication between the interior and exterior of the upper control shaft 24. The longitudinal axes of the slots 56 and 58 are opposed to each other and parallel to the axis of the upper control shaft 24.

An inner shaft 60 of stepped columnar shape is axially slidably fitted into the upper control shaft 24. A control lever 62 is screwed into a hole formed in the lower end portion of the inner shaft 60 and extends through the inner shaft 60 in the direction of the diameter thereof. One end portion of the control lever 62 projects from the upper control shaft 24 through the slot 56, whereas the other end portion extends into the slot 58.

A lock nut 64 is screwed onto the control lever 62 for fastening purposes, and a spacer 66 is clamped between the lock nut 64 and the inner shaft 60. The spacer 66 is fitted onto the control lever 62 in such a manner that the outer periphery of the spacer 66 is maintained in slidable contact with the inner periphery of the slot 56. The end portion of the control lever 62 which extends into the slot 58 is maintained in slidable contact with the inner periphery of the slot 58 which extends in the direction transverse to the longitudinal axis thereof.

The inner shaft 60 is urged in the axial upward direction by a return spring 68 which is constituted by a compression coil spring inserted in the upper control shaft 24. The lower end of the return spring 68 is supported by a pin 70 which is fixed to the upper control shaft 24. When the inner shaft 60 is moved by the urging force of the return spring 68 and the outer periphery of the spacer 66 is brought into contact with the longitudinal upper end portion of the inner periphery of the slot 56, further movement of the inner shaft 60 is inhibited.

A through-hole 72 is formed in the upper end of the inner shaft 60 and extends in the direction of the diameter thereof. The through-hole 72 consists of a portion having a circular cross-section whose diameter is constant across its axis and an end portion which is enlarged in a tapered form. A slot 74 is formed in the upper control shaft 24 at a location opposing the tapered opening of the through-hole 72. The longitudinal axis of the slot 74 is parallel to the axis of the upper control shaft 24.

A shift lever housing 76 having a C-like cross-sectional shape is fixed at its one end to the outer periphery of the upper control shaft 24 so as to cover the slot 74. In the distal end portion of the shift lever housing 76, a shaft 78 is supported at its opposite ends by side walls 76A which are opposed to each other, and an intermediate portion of a shift lever 80 is pivotably supported by the shaft 78. A ball-like portion 82 is formed at one end of the shift lever 80, and the ball-like portion 82 is fitted into the constant-diameter portion of the through-hole 72 in such a manner that they can be moved with respect to each other without any play. A shift knob 83 is, as shown in FIG. 2, fixed to the other end of the shift lever 80.

Figure 4:
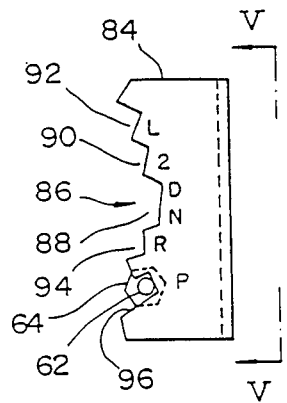
FIG. 4 is a view taken along line IV—IV of FIG. 3.
Figure 5:
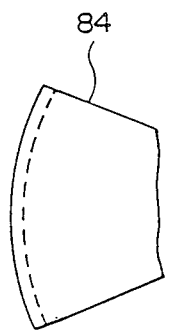
FIG. 5 is a view taken along line V—V of FIG. 4.
Figure 6:
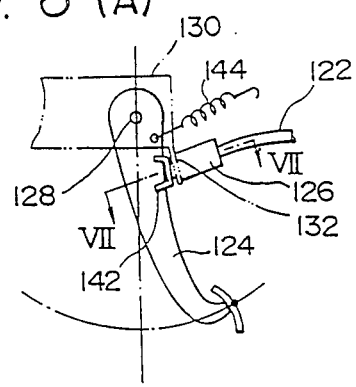
FIGS. 6(A), 6(B) and 6(C) are respectively side elevational views of a brake pedal which is provided with the apparatus according to the present embodiment.
Figure 6:
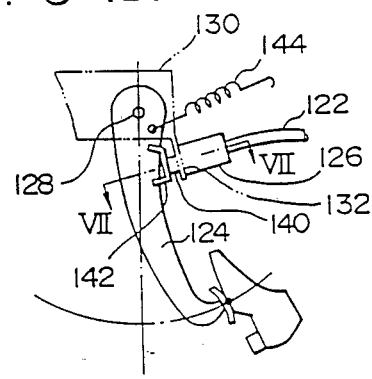
Figure 6:
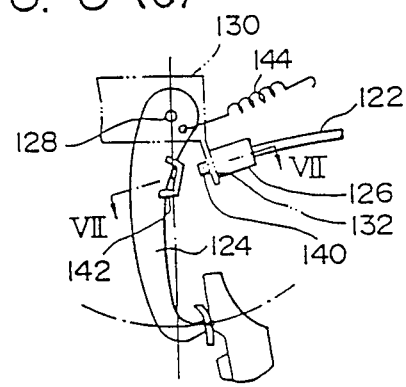

As shown in FIGS. 4 and 5, a detent plate 84 which is adapted to engage with the control lever 62 is fixed to the lower end portion of the upper support 20. The detent plate 84 is formed from a sheet material and has an approximately L-like configuration in cross section and a sectoral shape in plan view. A staircase-shaped cutout portion 86 is formed in one edge portion of the detent plate 84. The end portion of the control lever 62 which extends through the slot 56 is adapted to engage with the cutout portion 86. The cutout portion 86 includes a cutout 88 serving as a "D·N" shift-lever position, a cutout 90 serving as a "2" shift-lever position, a cutout 92 serving as an "L" shift-lever position, a cutout 94 serving as an "R" shift-lever position and a cutout 96 serving as a "P" shift-lever position.

Referring back to FIG. 3, a shift locker 100 which constitutes the primary portion of a shift lock mechanism is fixed to the upper support 20 at a location adjacent to the detent plate 84. As shown in detail in FIGS. 1(A) to 1(C), a cylindrical housing 104 is screwed onto a connecting member 102 fixed to the upper support 20, a slider 106 of stepped cylindrical shape is axially slidably fitted into the housing 104, and a lock pin 108 of stepped cylindrical shape is axially slidably fitted into the slider 106.

The slider 106 is urged in the direction away from the upper support 20 by a return spring 110 which is constituted by a compression coil spring. As shown in FIG. 1(B), when the end wall of the slider 106 opposite to the return spring 110 comes into contact with the facing end wall of the housing 104, further movement of the slider 106 is inhibited. The lock pin 108 is urged in the direction opposite to that of the slider 106 by a lock spring 112 which is constituted by a compression coil spring. As shown in FIGS. 1(A) and 1(B), when the stepped portion of the lock pin 108 comes into contact with the corresponding end wall of the slider 106, further movement of the lock pin 108 is inhibited.

Through-holes 114 and 116 are formed in the connecting member 102 and the wall portion of the upper support 20, respectively, and the lock pin 108 is capable of moving into the upper support 20 through the through-holes 114 and 116. Through-holes 118 and 120 are formed in the upper control shaft 24 and the inner shaft 60, respectively, and the through-holes 118 and 120 are adapted to align with the through-holes 114 and 116 when the end portion of the control lever 62 is engaged with the cutout 96 of the detent plate 84 which serves as the "P" shift-lever position. The lock pin 108 is also capable of moving into the through-holes 118 and 120.

An outer cable 122A of a push-pull cable 122 is engaged with the housing 104 of the shift locker 100, while an inner cable 122B of the push-pull cable 122 is engaged with the slider 106. The push-pull cable 122, as shown in FIG. 2, is arranged along the steering column and, as shown in FIGS. 6(A) to 6(C), extends to a controller 126 disposed in the vicinity of a brake pedal 124. The controller 126 is fixed to an extension plate 132 which extends from a pedal bracket 130 for rotatably supporting the upper end of the brake pedal 124.

Figure 7:
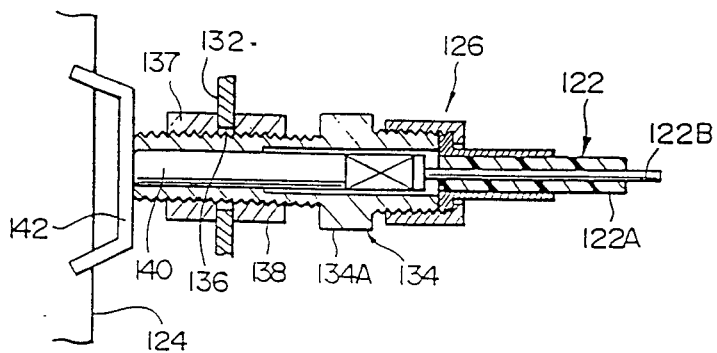
FIGS. 7(A), 7(B) and 7(C) are cross-sectional views taken along lines VII—VII of FIGS. 6(A), 6(B) and 6(C), respectively.
Figure 7:
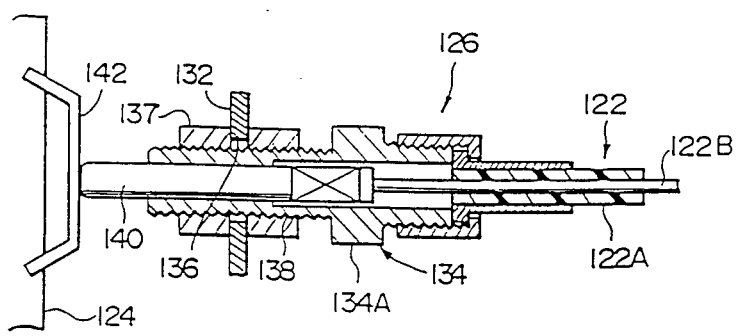
Figure 7C:
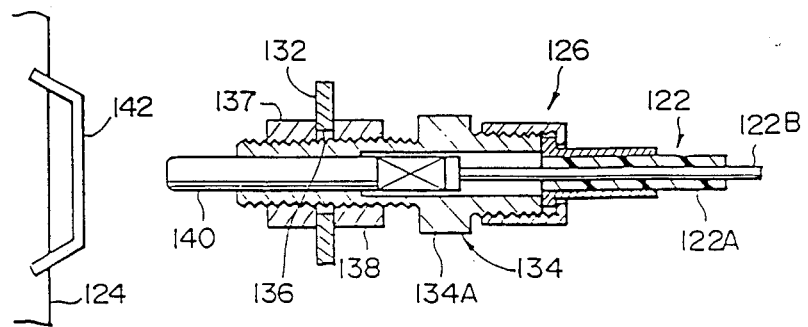

FIGS. 7(A) to 7(C) show details of the construction of the controller 126. As illustrated, a cylindrical housing 134 is fixed to the extension plate 132. More specifically, a through-hole 136 is formed in the extension plate 132 and a nut 137 is fixed by welding to one surface of the extension plate 132. A portion 134A having a hexagonal configuration in cross section is formed around the outer periphery of the housing 134 at an intermediate portion between the opposite ends thereof, and externally threaded portions extend over the outer periphery of the housing 134 in opposite directions from the hexagonal portion 134A.

When the housing 134 is to be fixed to the extension plate 132, a lock nut 138 is screwed onto the housing 134 and located in the vicinity of the hexagonal portion 134A. Then, the housing 134 is inserted into the through-hole 136 from the side opposite to the side of the extension plate 132 to which the nut 137 is fixed by welding and is then screwed into the nut 137. When the screwed end portion of the housing 134 is made to project from the nut 137 by a predetermined amount, then the lock nut 138 is screwed toward the extension plate 132. Finally, the lock nut 134A is tightened with a wrench while the hexagonal portion 134A is held with another wrench. Thus, the housing 134 is fixed to the extension plate 132 with the extension plate 132 clamped between the nut 137 and the lock nut 138.

A follow-pin 140 is axially slidably fitted into the housing 134. The outer cable 122A of the push-pull cable 122 is engaged with the housing 134, while its inner cable 122B is engaged with the follow-pin 140.

Thus, the follow-pin 140 is urged toward the brake pedal 124 through the intermediary of the push-pull cable 122 by the return spring 110 incorporated in the housing 104 of the shift locker 100. A pusher plate 142 is fixed to the brake pedal 124 at a location opposing the follow-pin 140.

FIG. 6(A) shows the state wherein the brake pedal 124 is not depressed, that is, wherein no braking operation is being performed. In the illustrated state, since the urging force of a return spring 144 of the brake pedal 124 is set at a level sufficiently greater than the urging force of the return spring 110 of the shift locker 100, the follow-pin 140 is pressed by the pusher plate 142 as shown in FIG. 7(A) and is thereby forced into the housing 134 against the urging force of the return spring 110. Accordingly, the outer end of the follow-pin 140 is made flush with the corresponding end surface of the housing 134. In this state, as shown in FIGS. 1(A) and 1(C), the slider 106 is moved toward the upper support 20, against the urging force of the return spring 110.

In this state, when a braking operation is performed by depressing the brake pedal 124 as shown in FIG. 6(B), the pusher plate 142 fixed to the brake pedal 124 moves away from the controller 126, but the follow-pin 140 is maintained in pressure contact with the pusher plate 142 by the urging force of the return spring 110. Accordingly, the follow-pin 140 follows the movement of the pusher plate 142 and partially moves out of the housing 134.

The outward movement of the follow-pin 140 from the housing 134, as shown in FIG. 1(B), is stopped when the slider 106 comes into contact with the end wall of the housing 104 so that further movement of the slider 106 is inhibited. At this point in time, since the brake pedal 124 has not yet reached its depression limit, it is further depressed to the depression limit shown in FIG. 6(C). Accordingly, the follow-pin 140 separates from the pusher plate 142 at an intermediate point during the stroke of the brake pedal 124.

As shown in FIG. 1(B), in a state wherein the movement of the slider 106 is inhibited due to the contact with the end wall of the housing 104, the lock pin 108 is urged by the lock spring 112 to travel to its limit at which the stepped portion of the lock pin 108 is maintained in contact with the corresponding end wall of the slider 106. In this state, the end of the lock pin 108 opposite to the stepped portion is located in the through-hole 116 formed in the upper support 20 so as not to interfere with the upper control shaft 24 or the inner shaft 60.

It is to be noted that the position of the controller 126 is adjusted in accordance with the height of the brake pedal 124. More specifically, the position of the controller 126 is adjusted so that the pusher plate 142 may be maintained in contact with the opposing end surface of the housing 134 when the brake pedal 124 is in contact with a stopper (not shown). In addition, the brake pedal 124 is adjusted so that, in this state, it may not move away from the stopper (not shown).

Figure 8:
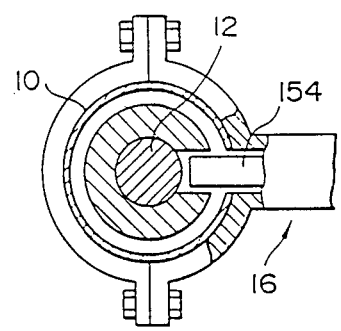
FIG. 8 is a cross-sectional view taken along line VIII—VIII of FIG. 2.
Figure 9:
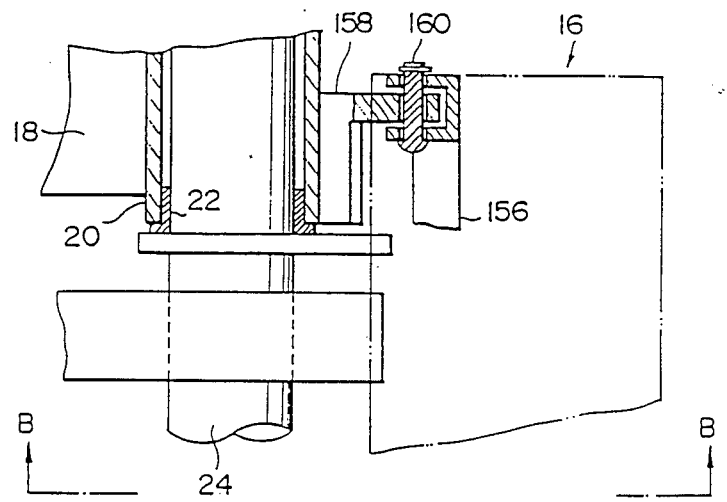
FIGS. 9(A) and 10(A) are partially sectional plan which respectively show the interlock device used in the present embodiment.
FIGS. 9(B) and 10(B) are elevational views taken along line B—B of FIGS. 9(A) and 10(A), respectively.
Figure 9:
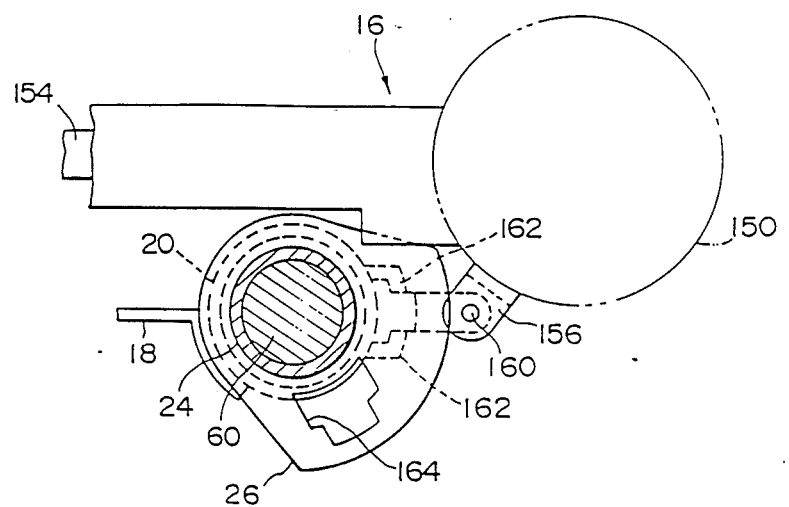

As shown in FIG. 2, the steering block 16 is provided with a key cylinder 150 and a lock bar 154. When a key plate 152 is inserted into the key cylinder 150 and rotated to a "lock" position, the lock bar 154, as shown in FIG. 8, engages with the steering shaft 12 to inhibit the rotation of the steering shaft 12.

When the key plate 152 is rotated to another position, the electrical circuit line can be switched on and off. The rotary motion of the key plate 152 is transformed into a linear motion to cause the movement member 156 shown in FIGS. 9 and 10 to move forwardly or backwardly along the axis of the upper control shaft 24. One end of an interlock bar 158 having an L-like configuration is pivotally supported on the movement member 156 by a pin 160. The side of the interlock bar 158 opposite to that end is slidably carried by a pair of guide rails 162 each of which is constituted by an L-shaped member fixed to the outer periphery of the upper support 20.

The other end of the L of the interlock bar 158 is adapted to engage with the interlock plate 26 which, as described above, is fixed to the outer periphery of the upper control shaft 24 at a location close to the upper end of the upper support 20. The interlock plate 26 has a through-hole 164 through which the interlock bar 158 can be inserted. The through-hole 164 is adapted to oppose the interlock bar 158 solely when the interlock plate 26 has been rotated and displaced with the rotation of the upper control shaft 24 to bring the control lever 62 into engagement with the cutout 96 which is formed in the detent plate 84 as the "P" shift-lever position.

Accordingly, if the control lever 62 is not engaged with the cutout 96 for the "P" shift-lever position, the interlock bar 158 is kept in contact with the interlock plate 26 so that further movement of the interlock bar 158 is inhibited. In this case, the key plate 152 cannot be rotated in the direction in which the interlock bar 158 presses the interlock plate 26. In order to rotate the key plate 152 to the "lock" position, the interlock bar 158 must be inserted through the through-hole 164 formed in the interlock plate 26.

In other words, the key plate 152 can be rotated to the "lock" position solely when the control bar 62 is engaged with the cutout 96 which is formed in the detent plate 84 as the "P" shift-lever position. On the other hand, if the control lever 62 is engaged with any one of the cutouts other than the cutout 96 for the "P" shift-lever position, the key plate 152 cannot be rotated to any one of the switch positions other than the "lock" position.

If the upper control shaft 24 is to be rotated when the interlock bar 158 is inserted through the through-hole 164 formed in the interlock plate 26, the outer periphery of the interlock bar 158 engages with the inner wall of the through-hole 164. Accordingly, in this state, it is impossible to rotate the upper control shaft 24.

The operation of the presently preferred embodiment will be described below.

Since the lock of the steering wheel is released when a vehicle is running, the key plate 152 is not set in the "lock" position and the interlock bar 158 is located at a position at which it does not interfere with the interlock plate 26 as shown in FIGS. 9(A) and 9(B). Accordingly, the rotary movement of the interlock plate 26 is not inhibited by the interlock bar 158.

In addition, since any one of the shift-lever positions other than "parking" is selected when the vehicle is running, the through-holes 118 and 120 which are formed in the upper control shaft 24 and the inner shaft 60, respectively, are not aligned with the through holes 114 and 116 which are formed in the connecting member 102 and the upper support 20, respectively, so that the lock pin 108 of the shift locker 100 does not move into the through-holes 118 and 120. Accordingly, the rotation of the upper control shaft 24 is not inhibited by the lock pin 108.

Therefore, while the vehicle is running, shifting operation is enabled, since the upper control shaft 24 can rotate without being obstructed by the interlock bar 158 or the lock pin 108.

It is to be noted that if the vehicle is running and the brake pedal 124 is not depressed as shown in FIG. 6(A), the lock pin 108, as shown in FIG. 1(C), is pressed against the outer periphery of the upper control shaft 24 by the urging force of the lock spring pin 112. Accordingly, the upper control pin 24 is caused to rotate about its axis or move therealong while sliding on the lock pin 108.

If the brake pedal 124 is depressed as shown in FIGS. 6(B) and 6(C), the contact end of the lock pin 108 is moved away from the outer periphery of the upper control shaft 24.

Shifting operation is performed by gripping the shift knob 83 and rotating the shift lever 80 about the axis of the upper control shaft 24. The operating power of the shift lever 80 is transmitted through the shift lever housing 76 to the upper control shaft 24, thereby rotating the upper control shaft 24. When the upper control shaft 24 is rotated, the control lever 62 is pressed against the peripheral walls of the slots 56 and 58 which are formed in the upper control shaft 24 in the direction transverse to their respective longitudinal axes. Thus, the control lever 62 is rotated integrally with the upper control shaft 24.

At this time, if it is desired to rotate the upper control shaft 24 in the direction in which the control lever 62 ascends the staircase-shaped cutout portion 86 formed in the detent plate 84, a selecting operation is performed prior to such a shifting operation. The selecting operation is carried out by gripping the shift knob 83 and shifting the shift lever 80 in the direction indicated by an arrow A of FIG. 3. The operating power of the shift lever 80 is transmitted to the inner shaft 60 by the action of a lever which employs the shaft 78 as the fulcrum and the ball-like portion 82 as the point of action. Thus, the inner shaft 60 is caused to move along the axis of the upper control shaft 24 in the direction indicated by an arrow B of FIG. 3 against the urging force of the return spring 68. The above-described shifting operation is carried out while maintaining the state provided by the selecting operation.

If the upper control shaft 24 is to be rotated in the direction in which the control lever 62 descends the staircase-shaped cutout portion 86 formed in the detent plate 84, the inner shaft 60 is moved by the urging force of the return spring 68 in the direction opposite to the arrow B of FIG. 3. Therefore, there is no need for any positive selecting operation.

The upper control shaft 24 and the lower control shaft 30 integral therewith are rotated by the above-described shifting operation. Thus, the shift arm 54 is rotated to an angular position which corresponds to the shift-lever position at which the control lever 62 is located. The rotation of the shift arm 54 is transmitted to the manual shift valve through the link mechanism so that the range of hydraulic pressure corresponding to the above shift-lever position is selected in the automatic transmission.

If the key plate 152 is to be rotated to the "lock" position while the vehicle is running, the interlock lever 158 moves into contact with the interlock plate 26 and further movement of the interlock bar 158 is inhibited, since any one of the shift-lever positions other than "parking" is selected during running. Accordingly, since the key plate 152 cannot be rotated to the "lock" position during running, the rotation of the steering shaft 12 is not inhibited.

If it is desired to park the running vehicle, the key plate 152 is rotated to stop the engine and it is further rotated to the "lock" position. At this time, if any one of the shift-lever positions other than "parking" has been selected, the key plate 152 cannot be rotated to the "lock" position as described above. It follows therefore that the shift-lever position of "parking" is selected. In a state wherein the shift-lever position of "parking" is selected, the interlock bar 158 is opposed to the through-hole 164 formed in the interlock plate 26, and therefore the key plate 152 can be rotated to the "lock" position.

Figure 10:
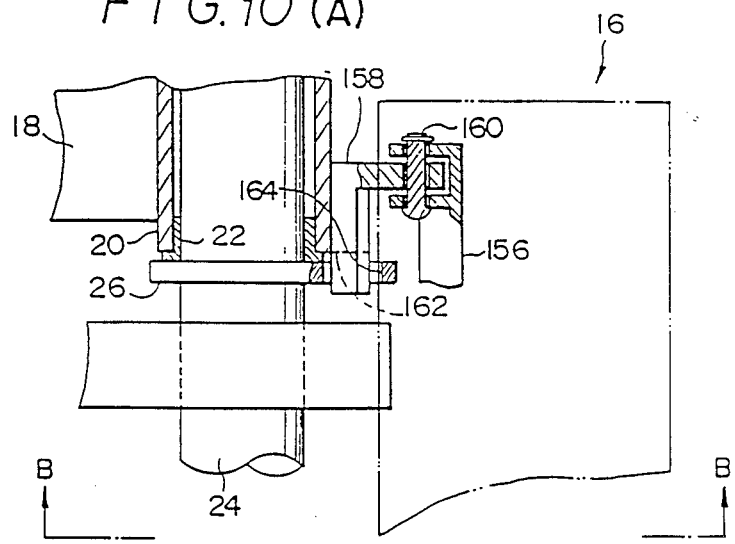
Figure 10:
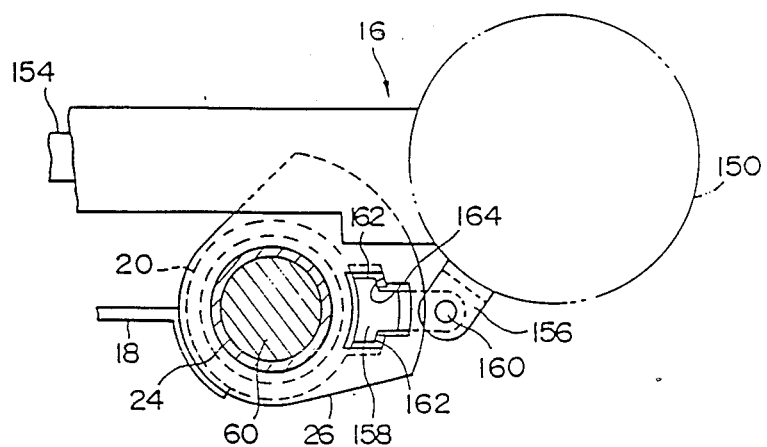

When the key plate 152 is rotated to the "lock" position, the lock bar 154, as shown in FIG. 8, engages with the steering shaft 12 to inhibit the rotation of the steering shaft 12. Simultaneously, as shown in FIG. 10, the interlock bar 158 is inserted through the through-hole 164 formed in the interlock plate 26. Accordingly, the rotation of the upper control shaft 24 is inhibited by the interlock bar 158 through the intermediary of the interlock plate 26.

In addition, when the shift-lever position of "parking" is selected, as shown in FIG. 1(A), each of the through-holes 118 and 120 formed in the upper control shaft 24 and the inner shaft 60, respectively, is moved to the position opposing the through-holes 114 and 116 formed in the connecting member 102 and the upper support 20, respectively. Thus, the lock pin 108 of the shift locker 100 is inserted into the through-holes 118 and 120 by the urging force of the lock spring 112. Accordingly, the rotation of the upper control shaft 24 is also inhibited by the lock pin 108.

As described above, the shift-lever position of "parking" is necessarily selected during parking. In this state, if another person enters the parked vehicle and tries to operate the shift lever 80, he cannot change the position of the shift lever 80 from the "parking" position to any other shift-lever position without at least the key plate 152.

In this manner, the parked vehicle is maintained in a state wherein the steering wheel 14 cannot be rotated, nor can the shift lever 80 be operated. Furthermore, since the shift-lever position of "parking" is selected, the rotary members in the automatic transmission are held in a non-rotatable state and thus the associated driving wheels are locked.

In order to start the parked vehicle, as can be seen from the foregoing, it is first of all necessary to operate the key plate 152. When the key plate 152 inserted in the key cylinder 150 and is rotated from the "lock" position, the steering shaft 12 is caused to disengage from the lock bar 154 and is placed in a rotatable state. Simultaneously, the interlock bar 158 moves out of the through-hole 164 formed in the interlock plate 26 and travels to a position, such as that shown in FIG. 9(A), at which the interlock bar 158 does not interfere with the interlock plate 26. In this manner, the upper control shaft 24 becomes rotatable without being inhibited by the interlock bar 158.

When the key plate 152 is rotated, the engine is started and the vehicle becomes capable of being driven. In order to move the vehicle, it is necessary to change the position of the shift lever 80 from the "parking" position to another shift-lever position such as "drive". At this time, if the brake pedal 124 is not depressed, no shifting operation can be performed since the rotation of the upper control shaft 24 is inhibited by the lock pin 108, as during the parking described above.

When the brake pedal 124 is depressed in this state, the follow-pin 140 projects from the housing 134 of the controller 126 to its projection limit as shown in FIGS. 6(B) and 7(B) before the brake pedal 124 reaches its depression limit (the state shown in FIGS. 6(C) and 7(C)).

In this state, the return spring 110 which presses the follow-pin 140 by means of the slider 106 and the push-pull cable 122, as shown in FIG. 1(B), is moved to a position at which the slider 106 is brought into contact with the end wall of the housing 104. Accordingly, the lock pin 108 is moved out of the through-holes 118 and 120 formed in the upper control shaft 24 and the inner shaft 60, respectively, and the upper control shaft 24 is set in a rotatable state. If, in this state, the operation of depressing the brake pedal 124 is halted, the lock pin 108 will again inhibit the rotation of the upper control shaft 24.

Accordingly, a shifting operation can be performed only when the brake pedal 124 is depressed. Therefore, whenever the position of the shift lever 80 is changed from the "parking" position to another shift-lever position, the brake pedal 124 is depressed, so that the vehicle is prevented from starting upon completion of the shifting operation. If the operation of depressing the brake pedal 124 is halted after the completion of the shifting operation, the vehicle can be started.

When the operation of depressing the brake pedal 124 is halted, the slider 102 is pressed by the pusher plate 142 through the intermediary of the push-pull cable 122 to travel against the urging force of the return spring 110. At this time, however, the shift lever 80 is not set in the "parking" position, and the through-holes 118 and 120 formed in the upper control shaft 24 and the inner shaft 60, respectively, are not located at a position opposing the through-holes 114 and 116 formed in the connecting member 102 and the upper support 20, respectively.

Accordingly, the lock pin 108, as shown in FIG. 1(C), is pressed against the outer periphery of the upper control shaft 24, and the lock pin 108 does not inhibit the rotation of the upper control shaft 24 if the shift-lever position of "parking" is not selected. Therefore, as described above, the position of the shift lever 80 can be changed to any one of the shift-lever positions other than "parking" while the vehicle is running.

The presently preferred embodiment of the shift lever apparatus which is constructed in the manner described above possesses the following advantages.

(1) The push-pull cable 122 interlocked with the brake pedal 124 performs its function during an initial stroke of the brake pedal 124 and it is therefore unnecessary that the push-pull cable 122 be operated over the full stroke of the brake pedal 124. Accordingly, the reliability of operation of the push-pull cable 122 is high compared with that of operation of a push-pull cable of a conventional type which follows over the full stroke of the brake pedal.

(2) If it is necessary to adjust the position of the controller 126, the position of the brake pedal 124 which abuts against the stopper has only to be adjusted. This adjustment can be made easily and accurately by screw means.

(3) Whether or not the shift-lever position of "parking" is selected, and whether or not the brake pedal 124 is depressed, the behavior of the brake pedal 124 does not change by virtue of a combination of the slider 106 and the lock pin 108. Accordingly, a brake operation can be performed without any adverse influence, and a highly reliable mechanism can be achieved.

(4) Since the brake pedal 124 does not need any special mechanism such as a link mechanism, there is no risk that in the brake operating system troubles may be caused by the failure, etc. of such a mechanism.

(5) Since the push-pull cable 122 is normally urged by urging means to couple the controller 126 with the shift locker 100 without any play, excellent response can be achieved.

(6) The behavior of the push-pull cable 122 is transmitted between the shift locker 100 and the controller 126 as a non-transformed motion in the direction of the axis thereof, and the direction of force transmission is not changed. Accordingly, a simple and highly reliable structure can be achieved.

(7) The shift locker 100 and the controller 126 are coupled by arranging the push-pull cable 122 along the steering column without detouring it midway. Accordingly, it is possible to easily arrange the push-pull cable 122 and hence to easily fix and support it.

(8) Since the interlock mechanism is arranged to directly transform the rotary motion of the key plate 152 into the linear motion of the interlock bar 158, good operating feeling can be achieved.

(9) Since the interlock mechanism is disposed in the vicinity of the key cylinder 150, the small stroke obtained in the key cylinder 150 (it is difficult to obtain a large stroke in the key cylinder 150) can be directly transmitted to the interlock bar 158 to cause it to positively perform the lock function thereof.

(10) The interlock plate 26 functions as a member for determining the axial position of the upper support 20 of the upper control shaft 24. Accordingly, it is possible to eliminate a positioning member such as a C ring in the shift lever apparatus.

(11) Since the shift lock mechanism and the interlock mechanism are independently supported on the upper support 20, it is possible to prevent various components from being centered on a portion of the upper support 20.

(12) Since the shift lock mechanism and the interlock mechanism are constituted by mutually independent mechanisms, high reliability can be attained as a whole.

(13) Since both the shift lock mechanism and the interlock mechanism have a simple structure, the number of parts required can be greatly reduced.

(14) In the interlock mechanism, a mounting error necessarily occurs between the upper control shaft 24 and the steering lock 16, mounted on the column tube 10 of the upper control shaft 24. However, the interlock mechanism according to the present embodiment is not susceptible to the influence of such an error.

If the steering lock 16 and the upper control shaft 24 are constructed as an integral structure, no error will occur in the interlock mechanism. However, in general, it is necessary to separate the steering lock 16 from the upper control shaft 24 in terms of a combination, etc. of a tilt mechanism.

Accordingly, the present embodiment is greatly useful in order to achieve a positive interlocked operation within the range of a small angle difference between the shift-lever position of "parking" and the adjacent shift-lever position of "reverse".

(15) Since the detent plate 84, the interlock mechanism and the shift lock mechanism can be designed by utilizing the axis of the upper control shaft 24 as the reference center line, their positions can be easily determined with high precision during manufacture. (since an angle difference is small between the shift-lever position of "parking" and the shift-lever position of "reverse", if both positions are not accurately determined, there is a risk of malfunction.)

Although, in the above-described embodiment, a shift lock is effected at the "parking" position by a combination of the shift lock mechanism and the so-called interlock mechanism, the shift lock may also be effected at the "neutral" position.

As described above, since the present invention has a construction which is mechanically controlled, it is possible to provide a low-cost shift lever apparatus for use with an automatic transmission in which the position of the shift lever can be changed from the "parking" or "neutral" position to another shift-lever position if the brakes of the vehicle are released.

What is claimed is:

1. A shift lever apparatus for an automatic transmission in a vehicle, comprising:
    a shaft member rotatable about its axis upon a shifting operation of a shift lever;
    a push-pull cable disposed to allow a first end thereof to be operated by contact of a control device provided at said first end with a brake operating mechanism; and
    a shift lock mechanism for engaging with said shaft member to inhibit the rotation of said shaft member when a shift-lever position corresponding to one of "parking" and "neutral" is selected, and to disengage from said shaft member by a braking operation of said brake operating mechanism which is mechanically related to said shift lock mechanism by said push-pull cable, a second end of which is connected to said shift lock mechanism, to thereby allow said shaft member to rotate about its axis.

2. A shift lever apparatus according to claim 1, wherein said shift lock mechanism includes a lock member insertable into a hole formed in said shaft member to inhibit the rotation of said shaft member when said shift-lever position corresponding to one of "parking" and "neutral" is selected, and movable out of said hole by the braking operation of said brake operating mechanism to thereby allow said shaft member to rotate about its axis.

3. A shift lever apparatus according to claim 2, wherein said shift lock mechanism further includes a slider which supports said lock member and which moves in the directions in which said lock member is moved into and out of said hole.

4. A shift lever apparatus according to claim 3, wherein said shift lock mechanism further includes first urging means for urging said slider in the direction in which said lock member moves out of said hole and second urging means interposed between said lock member and said slider for urging said lock member in the direction in which said lock member is inserted into said hole.

5. A shift lever apparatus according to claim 4, wherein said slider is connected to one end of said push-pull cable interlockingly operated by said brake operating mechanism and is moved with the movement of said push-pull cable.

6. A shift lever apparatus according to claim 5, wherein said shift lock mechanism further includes third urging means for pressing the other end of said push-pull cable with an urging force greater than the urging force of said first and second urging means while no braking operation is being performed by said brake operating mechanism.

7. A shift lever apparatus according to claim 6, wherein said third urging means comprises a spring for locating a brake pedal of said brake operating mechanism in a non-braking position.

8. A shift lever apparatus according to claim 7, wherein a follow-pin is connected to said other end of said push-pull cable, the urging force of said spring being transmitted to said push-pull cable through an intermediary of said brake pedal and said follow-pin.

9. A shift lever apparatus for an automatic transmission in a vehicle, comprising:
    a shift lever operable y a seat occupant;
    a shaft member rotatable about its axis upon an operation of rotating said shift lever to selectively engage with one of plurality of shift lever positions;
    a push-pull cable disposed to allow a first end thereof to be operated by contact of a control device provided at said first end with a brake operating mechanism; and
    a shift lock mechanism for engaging with said shaft member to inhibit the rotation of said shaft member when the shift-lever position corresponding to one of "parking" and "neutral" is selected, and to disengage from said shaft member by a braking operation of a brake pedal of said brake operating mechanism which is mechanically related to said shift lock mechanism by a push-pull cable, a second end of which is connected to said shift lock mechanism, to thereby allow said shaft member to rotate about its axis.

10. A shift lever apparatus according to claim 9, wherein said shift lock mechanism includes a lock pin insertable into a hole formed in said shaft member along the diameter thereof to inhibit the rotation of said shaft member when said shaft member is set at a position corresponding to one of "parking" and "neutral", and movable out of said hole by the braking operation of said brake pedal to thereby allow said shaft member to rotate about its axis.

11. A shift lever apparatus according to claim 10, wherein said shift lock mechanism further includes a slider which supports said lock pin and which moves in the directions in which said lock pin is moved into and out of said hole.

12. A shift lever apparatus according to claim 11, wherein said shift lock mechanism further includes a first spring for urging said slider in the direction in which said lock pin moves out of said hole and a second spring interposed between said lock pin and said slider for normally urging said lock pin in the direction in which said lock pin is inserted into said hole.

13. A shift lever apparatus according to claim 12, wherein said slider is connected to said second end of said push-pull cable interlockingly operated by said brake pedal and is moved with the movement of said push-pull cable.

14. A shift lever apparatus according to claim 13, wherein said shift lock mechanism further includes a third spring for pressing the other end of said push-pull cable with an urging force greater than the urging force of said first and second springs while no braking operation is being performed by said brake operating mechanism.

15. A shift lever apparatus according to claim 14, wherein said third spring keeps said brake pedal of said brake operating mechanism in a non-braking position.

16. A shift lever apparatus according to claim 15, wherein said shift lock mechanism is arranged such that, while a braking operation is being performed by said brake pedal, the transmission of the urging force of said third spring to said push-pull cable is cut off and said slider is moved by the urging force of said first spring in the direction in which said lock pin moves out of said hole.

17. A shift lever apparatus according to claim 16, wherein said shaft member includes a control rod which projects from its outer periphery in the radial direction, said control rod engaging with a detent plate disposed in the vicinity of the outer periphery of said shaft member to bring said shaft member into engagement with any one of said shift-lever positions.

18. A shift lock apparatus according to claim 1 wherein said brake operating mechanism has a brake pedal and said shift lock mechanism has a follow-pin and said brake pedal and said follow-pin are in contact with each other when said brake pedal is in a non-operating condition and are in non-contact with each other throughout an operation of said brake pedal.

* * * * *